United States Patent [19]
O'Connor, Jr.

[11] 3,779,514
[45] Dec. 18, 1973

[54] CONTROL VALVE AND PROCESS CONTROL SYSTEM

[75] Inventor: Joseph O'Connor, Jr., Goshen, N.Y.

[73] Assignee: Kieley & Mueller, Inc., Middletown, N.Y.

[22] Filed: Sept. 25, 1972

[21] Appl. No.: 291,930

Related U.S. Application Data

[62] Division of Ser. No. 112,890, Feb. 5, 1971, Pat. No. 3,709,245.

[52] U.S. Cl.................... 251/369, 290/52, 415/131
[51] Int. Cl............................................ F16k 51/00
[58] Field of Search........................... 415/203, 131; 290/52; 137/499; 251/369

[56] References Cited
UNITED STATES PATENTS

| | | | |
|---|---|---|---|
| 2,713,643 | 7/1955 | Rheingans | 290/52 X |
| 3,405,278 | 10/1968 | Ley | 290/52 |
| 1,171,857 | 2/1916 | Larner | 415/131 |

Primary Examiner—Henry T. Klinksiek
Assistant Examiner—Robert J. Miller
Attorney—Kenyon & Kenyon Reilly Carr & Chapin

[57] ABSTRACT

The control valve has a stator which imparts a swirl to the flow of fluid and a rotor which is rotated under the swirl of fluid. Energy is absorbed from the rotor in various ways. In one instance, the rotation of the rotor is subjected to a drag force which is induced in opposition to the force of rotation in order to control the pressure drop in the flow. In another instance, the rotation of the rotor is used to store electrical energy which can be used for other purposes throughout the process system.

6 Claims, 6 Drawing Figures

CONTROL VALVE AND PROCESS CONTROL SYSTEM

This is a division of application Ser. No. 112,890, filed Feb. 5, 1971, now U.S. Pat. No. 3,709,245.

This invention relates to a control valve and a controlled process system.

Heretofore, various control valves have been known for creating an energy loss or pressure drop for process control within a process sytem. For example, the energy loss or the pressure drop has been accomplished by the impingement of the fluid flow on inner valve surfaces, by turbulence, by self-impingement, and by impingement upon valve, body and closely associated piping surfaces. However, these control valves for process control have been inherently self-destructive since the constant erosive and cavitation effects of high velocity fluids upon the control valve, inner valve bodies and associated piping surfaces eventually wears out the valve. Further, by the very nature of the energy loss, the total enthalpy of a process is changed, that is, the control valve by its nature does remove, a certain percentage, e.g., 20 percent, of the total process energy imparted to a process. This removed energy has heretofore been unrecoverable.

It has also been known that various valve devices have utilized a rotor for measuring or indicating the amount of flow or flow velocity of a fluid passing through a valve. These valve devices have, however, merely been used as measuring devices and have not controlled the pressure drop in the flow of fluid. Instead, the measuring devices have been constructed so as to achieve a minimum of pressure drop.

Accordingly, it is an object of this invention to utilize the energy normally lost within a control valve, while retaining the flow control characteristics of a flow control valve.

It is another object of this invention to eliminate the erosive and cavitation effects of a pressure drop of a fluid within a control valve and to reduce noise generated by a fluid within a control valve.

It is another object of this invention to provide a control valve of simple construction for the elimination of erosive effects due to the flow of fluid therethrough.

It is another object of this invention to recover some percentage of the utilizable energy lost within a control valve so as to improve the total efficiency for a given process.

Briefly, the invention is directed to a control valve which accomplishes useful work while creating an energy loss or pressure drop in a fluid passing therethrough. In addition, the control valve is interconnected with various other components within a process system so that the energy obtained within the control valve can be used to operate these other components. In this way, the invention utilizes at least a part of the energy transformed in creating a pressure drop within a fluid flowing through the process sytem such that the overall efficiency of the system is increased.

The control valve includes a housing which is positioned to define a passageway for a flow of fluid, a stator which is mounted within the housing and a rotor which is mounted within the stator so as to rotate under the flow of fluid passing to the rotor from the stator. In one embodiment, the rotor is concentrically mounted within the stator and is axially movable with respect to the stator so that the amount of flow of fluid passing through the rotor can be varied. The rotor is also movable into a closed position in which the passageway for the flow of fluid is closed so that no fluid can flow through the control valve. In addition, a work useless means such as a drag inducing means is connected to the rotor so as to induce a drag force on the rotor under the flow of fluid to create a controlled pressure drop in the fluid flow.

In operation, during the induced rotation of the rotor, work is created from the energy transference which energy transference is a function of the engagement of the rotor within the stator. This work is then absorbed in the drag element. In addition, the drag element can be exposed to ambient temperatures in case high temperatures are generated within the drag element so as to improve energy dissipation.

In another embodiment wherein the rotor is axially movable with respect to the stator, the rotor is connected to a generator of the direct current type of alternating current type. The rotor is then used to generate an electrical charge in proportion to the rotational speed of the rotor under the influence of the fluid flow. The electrical energy which is so generated can either be stored in a suitable storage device or can be directed to another component within the process system.

In still another embodiment, the rotor is mounted in a fixed axial position with respect to the stator so that the entire flow of fluid passing from the stator is directed through the rotor. In this embodiment, the rotor can be connected to a suitable electrical storage device so as to obtain energy or can be connected to a suitable storage motor for speed control. In the first instance, where the rotor is connected to an electrical storage device to store energy, the rotor is directly connected through suitable electrical means such as brushes so as to impart a charge to the storage means. In the case where the rotor is connected to a motor, a coil is mounted about the rotor and a current is induced in the coil from the motor so as to impart a rotational force to the rotor in opposition to the direction of rotation imparted by the fluid flow. In this way, the electromagnetic system is used to control the speed of the rotor and thus the pressure drop in the fluid flow. In addition, this embodiment as in all electrical embodiments described herein can be made explosion proof and can be connected into a process computer which could command the pressure drop or flow.

In these various embodiments, the fluid flow first enters into the control valve and is thereafter divided upon impingement on the stator. In addition, the flow is passed circumferentially about the stator so that a substantially uniform distribution of the fluid flow is passed through the stator. The flow is thereafter directed against the rotor so as to induce a rotary motion in the rotor. Upon passing through the rotor, the fluid flow impinges upon itself and passes out of the rotor in a direction vertical to the rotor rotation. Thereafter, the fluid flow passes out of the control valve.

In still another embodiment, the control valve is modified so as to act as a process flow meter. In this embodiment, a coil is attached to the rotor induce direct current bits or intermittent signals which are calibrated as a measure of the rotation of the rotor. In addition, suitable pressure differential measuring devices are located at the inlet and outlet of the control valve to obtain pressure values at these points and a means, such as a linear resistance potentiometer, is connected to the valve to measure the opening between the engagement of the rotor and stator and obtain a signal characteristic thereof. The bits or signals, etc., from the coil, the measured pressure values from the measuring devices and the signals characteristic of the opening between the rotor and stator are fed into a computer and analyzed therein in a suitable fashion so that an instaneous readout of the flow passing through the control valve is obtained. The computer can also be programmed to effect changes in the rotor position in response to various obtained readouts so as to permit automatic control of the valve.

The process system according to the invention utilizes the control valve as described above in a fashion such that the energy which is lost due to the pressure drop is partially recovered in the form of work so as to operate various other components in the process system. For example, where the system includes an installation which feeds a flow of fluid into a pipeline in which the control valve is located as well as a feedpipe for supplying a working medium to the installation, the control valve is connected to an electrical generator so that the work performed by the rotor induces an electrical charge in the generator which is used to operate a further valve in the feedpipe to control the quantity of working medium delivered into the installation. The energy which is recovered by the control valve of the invention can, however, be used for any suitable purpose within the process system other than that examplefied. In this way, the overall efficiency of the process system can be significantly increased.

It is noted that the control valve of the invention can be used in a process system so as to recover a substantial portion of the energy which would otherwise be lost. For example, in a conventional process system wherein 20 percent of the energy imparted to the system may be used for purposes of control with a resulting efficiency of 80 percent, a portion of this 20 percent loss can be recovered by the invention. For example, 25 percent or more, that is, 5 percent or more of the total energy, can be recovered in the control valve of the invention. The recovered energy can then be used to control various other components through the system. Thus, instead of the process system having an overall efficiency of 80 percent, the efficiency can be increased to 85 percent or more. This will impart a significant savings in the overall cost of operation of process sytems.

These and other objects and advantages of the invention will become more apparent from the following detailed description and appended claims taken in conjunction with the accompanying drawings in which:

Figure 1:
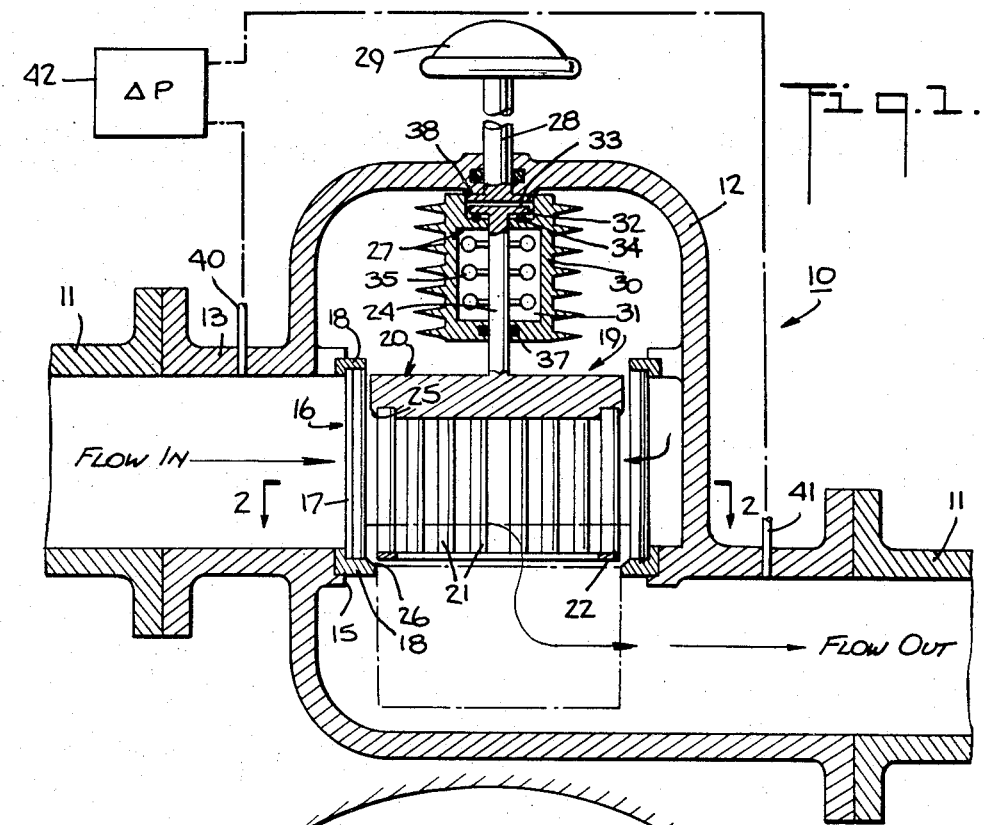
FIG. 1 illustrates a cross-sectional view of a control valve within a pipe line according to the invention.
Figure 2:
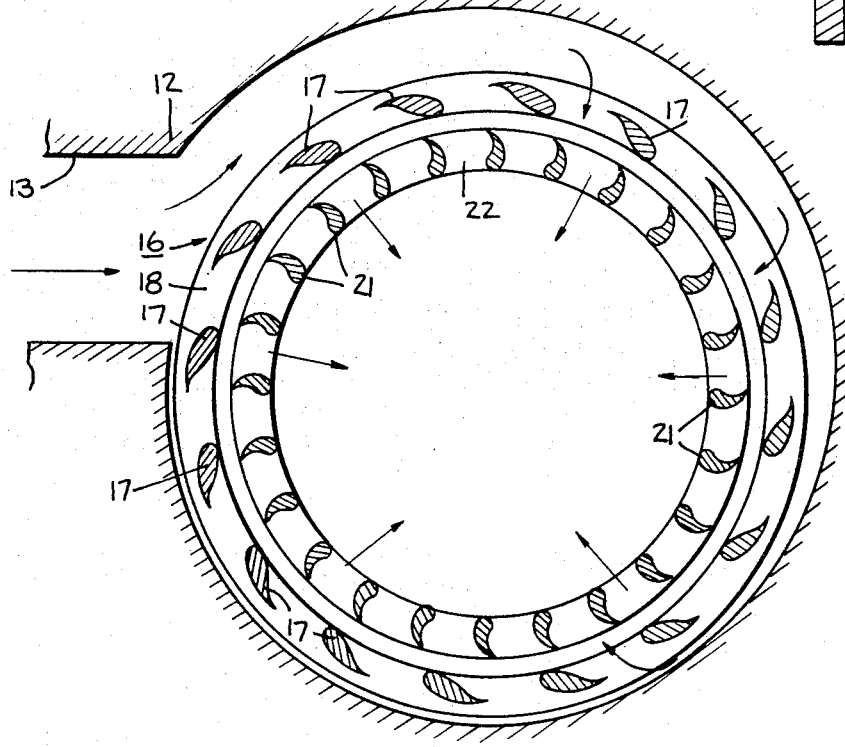
FIG. 2 illustrates a view taken on line 2—2 of FIG. 1.
Figure 3:
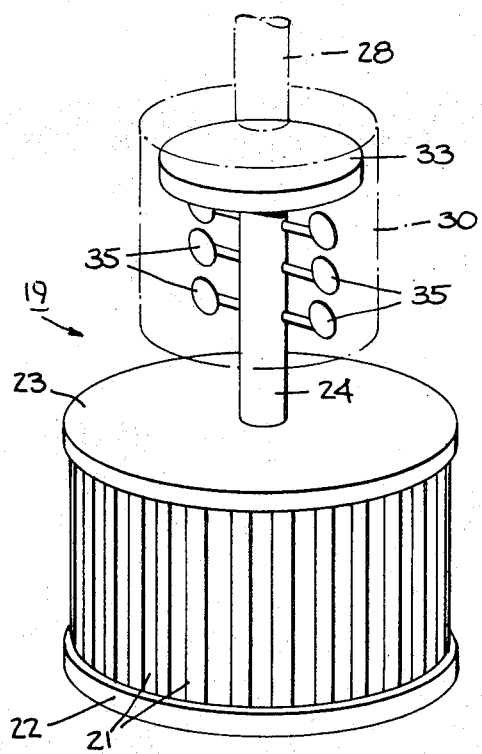
FIG. 3 illustrates a perspective view of a rotor and drag element according to the invention.

Referring to FIG. 1, the control valve 10 is interconnected within a pipeline 11 so as to intercept a flow of fluid passing through the pipeline 11. The control valve 10 includes a housing 12 having an inlet 13 on one side and an outlet 14 on the opposite side with the outlet 14 being disposed in a different plane from the inlet 13. In addition, an aperture 15 is disposed within the housing 12 between the inlet 13 and outlet 14 for the flow of fluid therethrough. A stator 16 is mounted within the housing 12 and includes a plurality of stator blades 17 which are disposed in transverse relation to the flow of fluid passing into the inlet 13 of the housing 12. The stator blades 17 are each mounted in a pair of rings 18 and are inclined with respect to the rings 18 so as to direct the fluid flow into the interior of the stator 16 in a swirl. In addition, the stator 16 is spaced from the internal wall of the housing 12 so that the fluid flow is directed circumferentially about the stator 16 in a substantially uniform manner so that a substantially uniform flow of fluid passes into the stator interior. The lowermost ring 18 as shown, of the stator 16 is constructed as a seat ring and is seated about the aperture 15 of the housing 12. In addition, a rotor 19 is concentrically mounted within the stator 16 and is axially movable with respect thereto. The rotor 19 includes a rotor cage 20 which is formed of a plurality of rotor blades 21, a ring 22 in which the blades 21 are mounted at the lower ends and a sealing disc 23 in which the blades 21 are mounted at the upper end. The rotor blades 21 are substantially parallel to the stator blades 17 and are aligned with respect to the rotor axis and the stator blades 17 so that the fluid flows passing from the stator 16 impinge on the rotor blades 21 to impart a rotary motion to the rotor 19. In addition, the rotor 19 includes a rotor shaft 24 which is secured to the sealing disc 23 and hich passes upwardly out of the plane of the stator 16.

The sealing disc 23 is provided with a bevelled surface 25 to mate with a corresponding bevel surface 26 on the seat ring 18 of the stator 16 when the rotor 19 is moved into a closed position. In this position, the sealing disc 23 sealingly seats on the seat ring 18 so as to close off any flow of fluid through the control valve 10.

In order to move the rotor 19 axially with respect to the stator 16, the rotor shaft 24 is connected via a thrust bearing 27 to a stem 28 which passes upwardly out of the valve housing 12. This stem 28 is of any suitable known construction and can be connected to a hand wheel 29 for manual operation or an auxiliary power operated device such as a diaphragm motor actuator, electric motor actuator or piston actuator, which positions the rotor within the stator in accordance with a received signal for automatic operation of the valve 10. For example, the valve stem 28 is threadably mounted within the valve housing 12 so as to be moved longitudinally into or out of the housing 12 upon rotation.

In order to induce a drag force on the rotor 19, a chamber 30 is secured to the lower end of the valve stem 28 to define a space for a viscous fluid or liquid 31. In addition, the chamber 30 is provided with a recess 32 at the upper end and the rotor shaft 24 is provided with a thrust plate 33 which fits into the recess 32 while a plurality of roller ball bearings 34 are disposed between the chamber 30 and thrust plate 33 to from the thrust bearing 27. In addition, a plurality of paddles 35 or other suitable members are secured to the rotor shaft 24 within the chamber 30 to rotate within the viscous fluid 31 in the chamber 30 upon rotation of the shaft 24 to impart a drag force on the rotor shaft 24. The chamber 30 is also provided with a plurality of radiating fins 36 which act as heat dissipating means for any heat which is developed within the chamber 30 as well as with a sealing ring 37 at the lower end to prevent passage of the viscous fluid 31 out of the chamber 30 along the rotor shaft 24.

In order to secure the valve stem 28 to the chamber 30, the lower end of the valve stem 28 is provided with a flanged portion 38 which is secured as by threading into the recessed portion 32 of the chamber 30 over the flanged plate 33 of the rotor shaft 24. In this way, the diameter of the valve stem 28 can be made with a reduced size.

In addition, a suitable pressure measuring means 39 is connected to the valve 10 to measure the pressure drop through the valve 10. The pressure measuring means 39 includes a pressure measuring tube 40 at the inlet 13 to the housing 12 and a similar tube 41 at the outlet 14 for measuring the pressure thereat and a suitable means 42 connected to the tubes 40, 41 for measuring the difference in pressure.

In operation, a flow of fluid passes from the pipeline 11 into the housing 12 through the inlet 13 and passes circumferentially about the stator 16. At the same time, the flow passes between the blades 17 of the stator 16 and are directed to impinge upon the rotor blades 21 so as to impart a rotary motion to the rotor 19. Upon passing through the rotor blades 21, the fluid flow impinges upon itself and is directed downwardly, that is, perpendicularly to the original path of flow into the housing 12 so as to flow through the aperture 15 leading to the outlet 14 of the valve housing 12. As the rotor 19 is forced to rotate under the action of the fluid flow, the paddles 35 within the chamber 30 are moved through the fluid 31. However, since the fluid 31 resists the rotation of the paddles 35, a drag force is imposed on the rotor 19 in opposition to the rotary force imposed by the fluid flow. As a result, the rotor 19 resists the fluid flow so that a pressure drop is imposed upon the flow of fluid passing through the rotor 19.

In order to vary the amount of pressure drop for a given flow, the rotor cage 20 is rasied or lowered within the stator 16 by means of the hand wheel 29 or automatic actuator.

In order to close off the flow of fluid through the control valve 10, the hand wheel 29 or automatic actuator is operated until the sealing disc 23 of the rotor 19 seats on the seat ring 18 of the stator 16. Alternatively, in order to permit the entire flow of fluid to pass through the valve 10 without a change in pressure, the handwheel 29 or automatic actuator is operated so that the rotor 19 is retracted completely from within the stator 16 or to a maximum position to permit a standard energy loss to be obtained for the control valve purpose.

Figure 4:
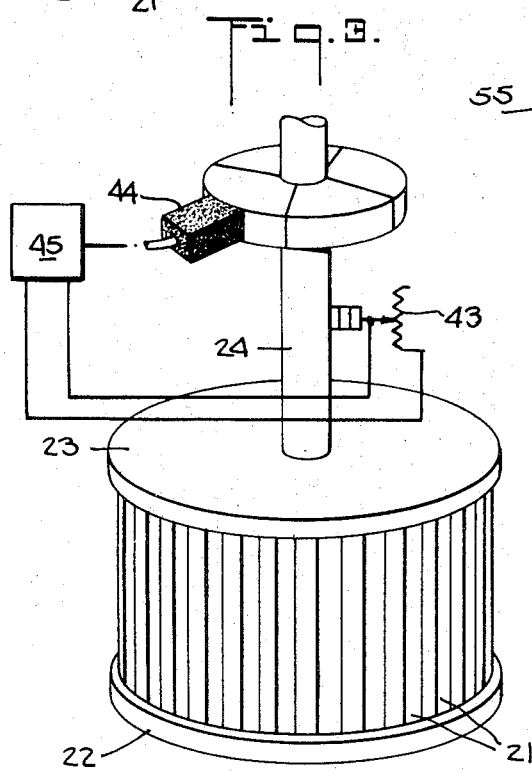
FIG. 4 illustrates a rotor as in FIG. 1 further provided with a meter.

Referring to FIG. 4, wherein like reference characters indicate like parts as above, the valve is provided with a meter means 43 for obtaining a signal characteristic of the flow through the valve. This meter means 43 which is, for example, in the form of a linear potentiometer, cooperates with the rotor shaft 24 so as to emit a signal indicative of the position of the rotor shaft 24 and, thus, the amount of opening between the rotor 19 and stator 16. In addition, a pick-up or counter means 44 is connected electro-magnetically, or otherwise, to the rotor shaft 24 to measure the speed of the rotor 19 by counting the number of revolutions of the rotor shaft 24. For example, a coil is attached to the rotor shaft 24 to produce or induce direct current bits with the engagement of the rotor in the stator which are calibrated as a measure of the rotation of the rotor 19.

Also, a computer 45 of known construction is connected to the meter means 43 and counter means 44 to receive the signals from these respective means 43, 44 characteristic of the rotor position and speed. Still further, the pressure measuring means 42 (FIG. 1) is connected to the computer 45 to deliver a signal thereto characteristic of the pressure drop across the valve. The computer 45 receives the information from these three means 42, 43, 44 and analyzes and compares the information with predetermined information so as to indicate the flow passing through the control valve at any instant in time.

In operation, the valve, in addition to obtaining work as above described, can be automatically operated by a suitable programming of the computer 45 in response to the signals received from the meter 43, counter 44 and pressure measuring means 42 so as to actuate an actuator, as above described, connected to the valve stem 28. This would permit the valve to be incorporated in a fully automated control system.

Figure 5:
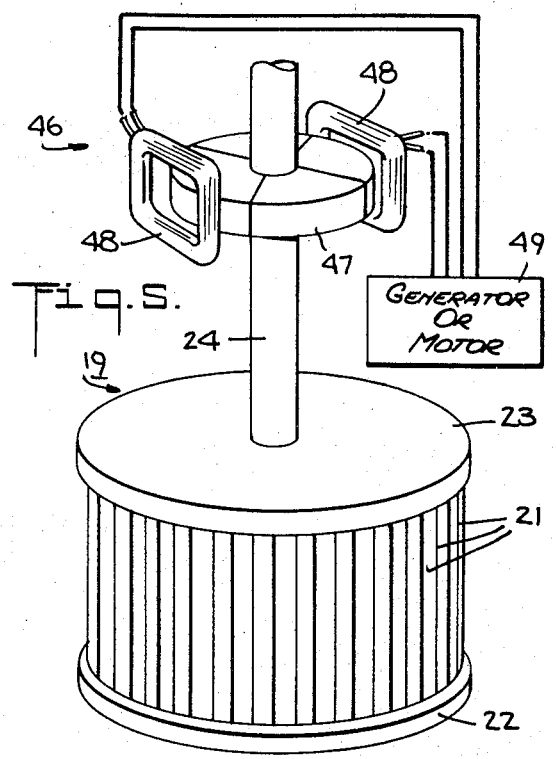
FIG. 5 illustrates a further modification according to the invention.

Referring to FIG. 5, wherein like reference characters are used to indicate like parts as above, an electromagnetic means 46 is used to impart a drag force on the rotating rotor 19. To this end, a magnet 47 is fixedly secured on the rotor shaft 24 and a pair of coils 48 are disposed on opposite sides of the magnet 47. Each of these coils 48 is connected to a suitable electrical device 49 such as a variable DC motor so as to receive a current therefrom. Upon receiving a predetermined current, a magnetic field is induced by the coils 48 which causes the magnet 47 and thus, the rotor 19, to rotate in a direction opposite to the flow induced rotation. Thus, during operation, as the motor 49 can be controlled, the drag force can be controlled so that the electro-magnetic means 46 imposes a controlled force on the rotor shaft 24 to reduce the speed of rotation of the rotor 19. The remainder of the control valve and the operation thereof is similar to that described above and need not be repeated.

Alternatively, in order to obtain electrical energy from the work created by the rotor 19, the motor 49 is replaced by a generator such as a direct current or an alternating current generator. In this way, the rotation of the rotor 19 creates electrical energy in the generator 49 which energy can be used for any suitable purpose such as for storage in a battery.

Figure 6:
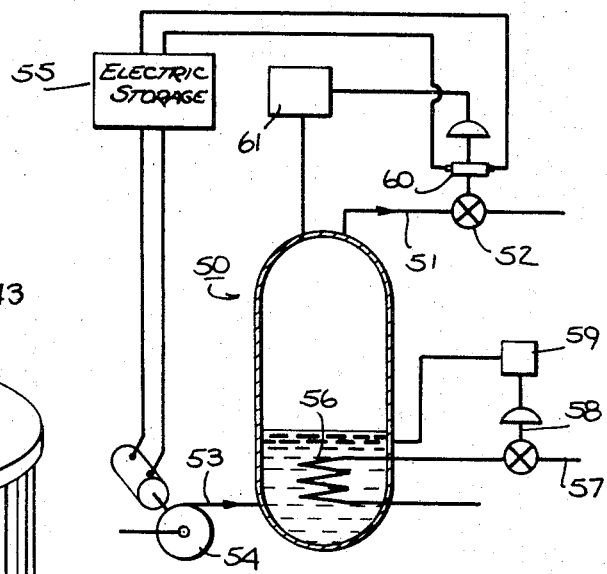
FIG. 6 illustrates a schematic view of a process system incorporating a control valve according to the invention.

Referring to FIG. 6, a process system which includes, for example, an installation 50 for delivering a flow of fluid such as steam into a pipe line 51 has a control valve 52 as described in FIG. 5 therein. This system 50 utilizes the energy obtained by the control valve 52 for controlling other components in the system. For example, a feed pipe 53 which is connected to the installation 50 to supply a working medium such as feed water is provided with a constant or variable speed pump 54 which is electrically connected to an electric storage device 55 so as to receive energy for operation of the pump 54 to regulate the flow of feed water passing to the installation 50. A suitable heating coil 56 is also located within the installation 50 and is supplied with a heating medium via a pipe line 57 which also has a valve 58 therein. This valve 58 is regulated or operated by a suitable temperature controller 59, as is known, in response to the temperature of the feed water in the installation 50.

In addition, the control valve 52 which is connected with a generator 60, as above described, to deliver electrical energy to the storage device 55 is also connected to a pressure controller 61 as is known. This pressure controller 61 serves to measure the vapor pressure in the installation 50 and to regulate the control valve 52 in response to such vapor pressure.

In operation, as steam is generated and delivered through the pipe line 51 to a consumer (not shown), the control valve 52 is set to maintain a predetermined pressure drop in the flow. At the same time, the control valve 52 is able to obtain work from the steam flow and to convert this work via the generator 60 into electrical energy which is stored in the storage device 55. Should the system require a change in the rate of feed water input, the pump 54 is actuated via the electrical energy stored in the storage device 55 to increase or decrease the feed water input.

The invention thus provides a valve which utilizes the work created in effecting a pressure drop in a fluid flow so as to eliminate the erosive and cavitational effects of the pressure drop of the fluid. By redirecting the fluid flow in the pattern described above through the stator and rotor, there is a reduction in the wear and tear on the overall control valve.

Further, the invention provides a control valve which when used in combination with a generator is able to recover a percentage of the energy lost in controlling the pressure drop in the fluid flow so as to improve the total efficiency of the given process.

What is claimed is:

1. In a valve, the combination including
a housing defining a passageway for the flow of a fluid;
a stator mounted within said housing in the path of flow of the fluid to impart a swirl to the fluid passing therethrough;
a seat ring on said stator to define an aperture for the flow of fluid passing out of said stator;
a rotor rotatably mounted downstream of said stator in the path of flow of the fluid for rotation under the flow of fluid passing therethrough;
a sealing disc mounted on said rotor and having a surface for mating with said seat ring in a closed position of said rotor to seal said aperture of said seat ring to the flow of fluid; and
means for inducing a drag force on said rotor in a direction opposite to the direction of rotation of said rotor under the flow of fluid passing therethrough to create a controlled pressure drop in the flow of fluid.

2. A control valve as set forth in claim 1 wherein said rotor is concentrically mounted in a fixed position within said stator and includes a rotor shaft extending out of the plane of said stator.

3. A valve as set forth in claim 1 wherein said rotor is concentrically mounted with said stator.

4. A valve as set forth in claim 1 wherein said stator is mounted in said passageway in transverse relation to the path of flow to impart a circumferential swirl to the flow of fluid passing therethrough.

5. A valve as set forth in claim 1 wherein said rotor includes a rotor cage having a plurality of blades disposed within said stator and said stator includes a plurality of blades for directing the flow of fluid onto said blades of said rotor.

6. A valve as set forth in claim 5 wherein said rotor further includes a rotor shaft extending from said cage and wherein said means for inducing a drag force includes a chamber about said rotor shaft defining a space for a viscous liquid therein and a plurality of paddles mounted on said rotor shaft within said chamber for rotation in the viscous liquid therein.

* * * * *

UNITED STATES PATENT OFFICE
CERTIFICATE OF CORRECTION

Patent No. 3,779,514　　　　　　　　　Dated December 18, 1973

Inventor(s) Joseph O'Connor, Jr.

It is certified that error appears in the above-identified patent and that said Letters Patent are hereby corrected as shown below:

Column 1, line 9, "sytem" should be --system--.

Column 2, line 61, after "rotor" insert --to--.

Column 4, line 33, "hich" should be --which--.

Column 4, line 64, "from" should be --form--.

Column 5, line 43, "rasied" should be --raised--.

Signed and sealed this 16th day of July 1974.

(SEAL)
Attest:

McCOY M. GIBSON, JR.　　　　　　　　C. MARSHALL DANN
Attesting Officer　　　　　　　　　Commissioner of Patents